Jan. 8, 1924.  1,480,451
C. J. KOCH
BABY CARRIAGE
Filed Aug. 29, 1922   2 Sheets-Sheet 2
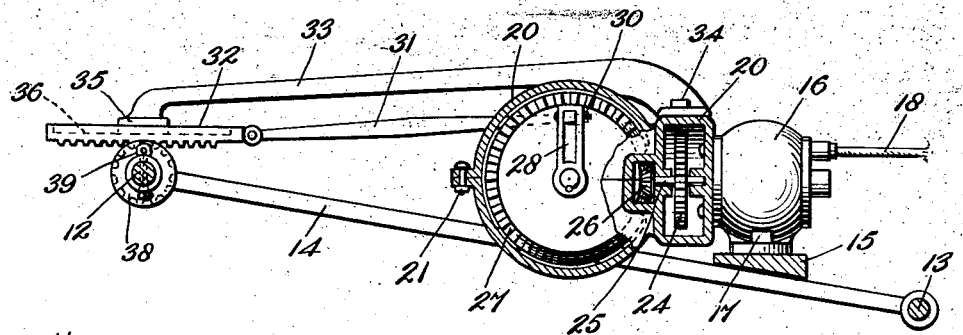
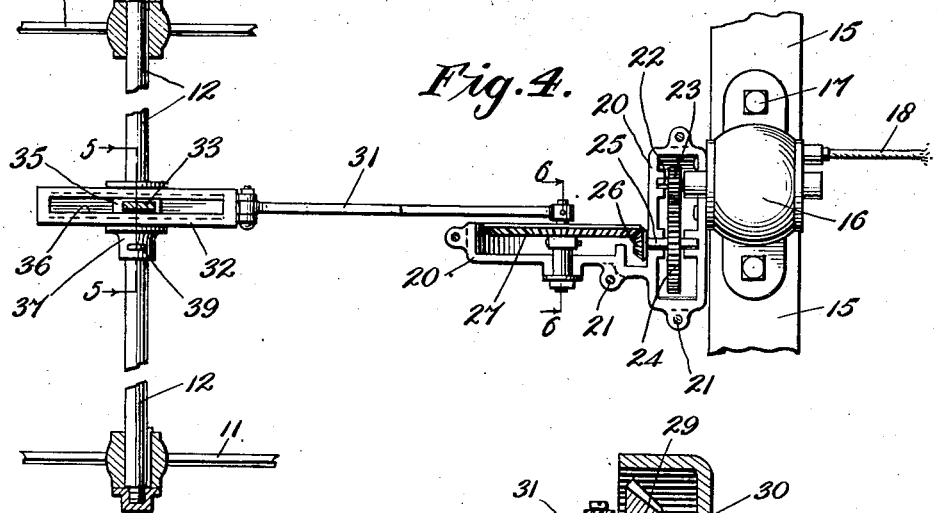
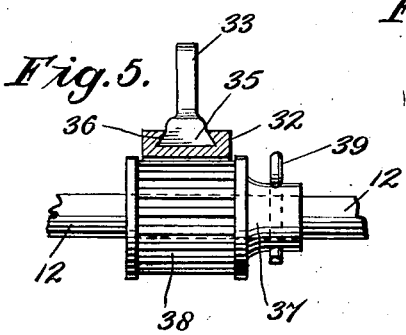
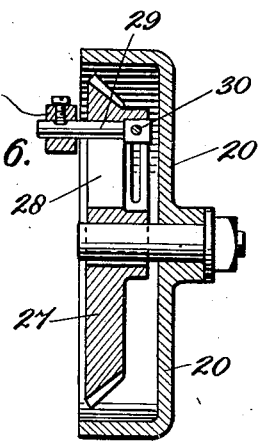
Inventor
Camille J. Koch
By Wilkinson & Giusta
Attorneys Patented Jan. 8, 1924.

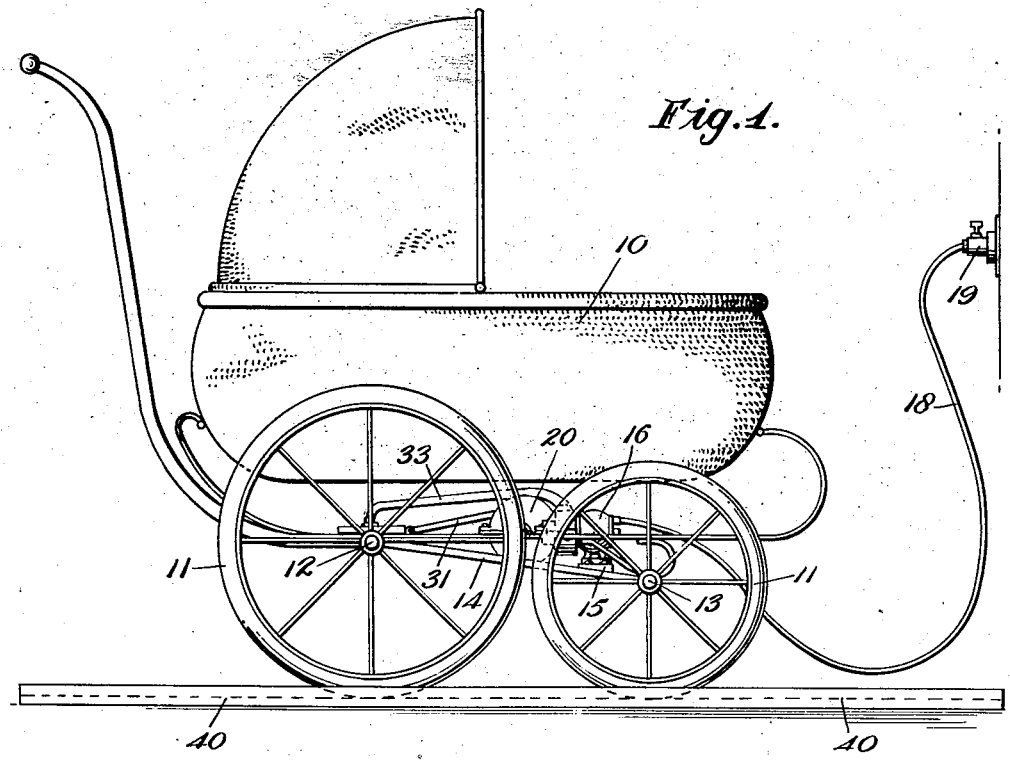
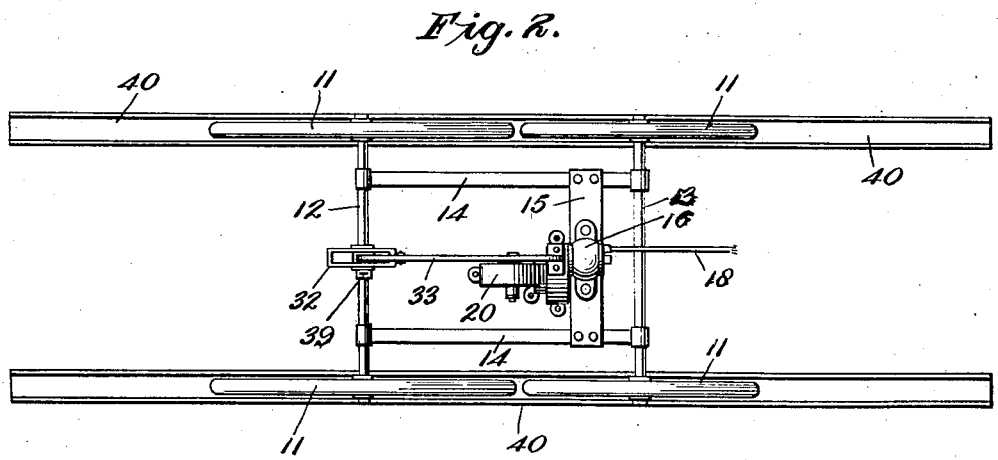

1,480,451

UNITED STATES PATENT OFFICE.

CAMILLE J. KOCH, OF BAYOU GOULA, LOUISIANA, ASSIGNOR OF ONE-HALF TO EDWARD G. KOCH, OF BAYOU GOULA, LOUISIANA.

BABY CARRIAGE.

Application filed August 29, 1922. Serial No. 584,978.

*To all whom it may concern:*

Be it known that I, CAMILLE J. KOCH, a citizen of the United States, residing at Bayou Goula, parish of Iberville, and State of Lousiana, have invented certain new and useful Improvements in Baby Carriages, of which the following is a specification.

This invention relates to baby carriages or the like, and particularly to means for oscillating the vehicle.

In vehicles for babies it is customary to wheel the same backward and forward for the purpose of pacifying and quieting the occupant, and it is the particular object of this invention to accomplish this movement of the vehicle automatically.

To this end the invention consists essentially of an electric motor mounted upon the frame of the vehicle, which motor is connected through a reduction gearing to one of the axles of the vehicle, whereby the desired movement is imparted to the wheels. In order to insure the desired path of travel of the vehicle a track is provided on which the wheels of the vehicle rest, the vehicle traveling backward and forward along this length of track.

In order to enable the vehicle to be used as the usual perambulator means are provided for removably coupling the electric-motor to the axle of the vehicle whereupon the device may be manually wheeled while the automatic propelling means remains inoperative.

The novel combination, construction and arrangement of parts wherein the object of this invention is efficiently accomplished will be made more apparent as the description proceeds, especially when considered in connection with the accompanying drawings in which;

Figure 1 is a side elevation of a baby carriage constructed in accordance with this invention;

Fig. 2 is a bottom plan view of the structure illustrated in Fig. 1;

Fig. 3 is an enlarged longitudinal fragmentary sectional view illustrating more in detail the propelling mechanism;

Fig. 4 is a longitudinal horizontal section through the structure illustrated in Fig. 3, certain parts being shown in elevation;

Fig. 5 is a fragmentary sectional view taken on the plane indicated by the line 5—5 in Fig. 4; and, Fig. 6 is a fragmentary sectional view taken on the plane indicated by the line 6—6 in Fig. 4.

Referring now more particularly to the drawings wherein like reference characters indicate like parts throughout, it will be noted that there is illustrated a vehicle such as a baby carriage provided with a body 10 and wheels 11. One pair of wheels 11 is mounted on an axle 12, one of the wheels 11 rotating freely on this axle, while the other wheel is fixed thereto to eliminate the necessity for differential gearing, as is customary in vehicle construction.

Extending between the axle 12 and a second axle 13 is a pair of frame members or supports 14, and spanning the distance between the supports 14 is a cross brace or frame member 15. Mounted upon the support 15 is an electric motor 16, this motor being preferably bolted to the support 15 as indicated at 17. The terminal cord 18 of the motor is illustrated as being connected to a wall socket 19, whereby electric energy is supplied to the motor 16. However, current may be supplied to the motor 16 from any other suitable source.

Secured to the motor 16 is a casing or housing 20, formed in halves and bolted together by a plurality of bolts 21. Contained in this housing is the following gear train.

Keyed to the motor shaft 22 is a pinion 23 which meshes with a gear wheel 24 carried by a shaft 25. On the end of the shaft 25 is a bevelled pinion 26 which meshes with a bevelled gear 27. It will be noted that the ratio between the gears 23 and 24 and the bevelled gears 26 and 27 is such that while the motor may rotate at a relatively high speed this speed is reduced sufficiently so that in operation the vehicle will oscillate at a relatively slow and even speed. It will be furthermore noted that the train of gearing just described is completely contained and housed within the housing 20, whereby parts are protected from dirt and the like, and furthermore are prevented from coming into engagement with covering, and the like, used in connection with the vehicle.

The bevelled gear 27 is provided with a radially disposed slot 28 in which a stub shaft 29 is disposed, which stub shaft 29 may be adjusted radially of the gear 27 and secured in its adjusted position by a nut and bolt 30. Secured to the stub shaft 29 is a connecting rod 31, the other end of which is pivoted to a rack 32. The rack is slidingly mounted by means of a bracket arm 33 bolted as at 34 to the housing or casing 20, the other end of this bracket being dovetailed in cross section, as indicated at 35 in Fig. 5, whereupon it engages a correspondingly shaped groove 36, formed in the rack member 32. In this way the rack 32 is slidingly suspended.

Loosely mounted on the axle 12 is a sleeve 37, which sleeve has formed integrally therewith a pinion 38. The pinion 38 is adapted to mesh with the teeth of the rack 32, as will be immediately apparent. For coupling the sleeve 37 to the axle 12 there is provided a pin 39 which extends through aligned apertures formed in the sleeve 37 and the axle 12. In this manner the sleeve may be coupled with the axle 12 so as to rotate therewith and the vehicle thereby propelled by the electric motor 16. When, however, it is desired to manually wheel the vehicle the pin 39 is removed, whereupon the shaft 12 and sleeve 37 rotates freely on the shaft 12 and the electric motor and the train of gearing operated thereby remains idle.

For defining the path of travel of the vehicle there is provided a pair of track rails 40, which are preferably U-shaped in cross section and adapted to receive and guide the wheels 11 of the vehicle, as is clearly illustrated in Figs. 1 and 2. In order to collapse the track the rails may be made of rubber, or may be made of metal formed in sections, which sections are hingedly united. Thus when the track is not being employed the same may be conveniently stored away. It will be immediately obvious that the use of the track is optional and it is only employed where it is essential that the course of the vehicle be positively defined.

From the foregoing it will be immediately apparent that after the sleeve 37 has been coupled to the axle 12 by means of the pin 39 and the current to the electric motor 16 turned on, the vehicle will oscillate at a slow and steady speed. The oscillatory movement of the vehicle is caused by the train of gearing described; a rotation of the pinion 27 causing a reciprocation of the rack 32 and a consequential backward and forward movement of the vehicle. As was mentioned, the stub shaft 29 is adjustable radially of the gear pinion 27, and in this manner the distance which the vehicle travels may be regulated within certain limits. Obviously by moving the stub shaft 29 nearer the center of the pinion 27, the throw of the connecting rod 31 will be lessened, thereby reducing the distance travelled by the vehicle.

With a baby carriage, or the like, equipped in accordance with this invention, the usual oscillation of the baby carriage, which in some instances is necessary to pacify and quiet a baby, may be accomplished mechanically. When the baby has been quieted or has fallen asleep, the current to the motor is shut off, and if desired, the terminal cord 18 may be disconnected and the pin 39 removed, whereby the vehicle may be manually wheeled to any place desired.

From the foregoing it will be immediately apparent that I have provided an arrangement which is simple in construction and operation and which will efficiently accomplish the desired result. While one specific embodiment of the invention is illustrated and described herein it is not intended that the invention be limited to the illustration defined but reservation is made to make such changes as may come within the purview of the accompanying claims.

Having thus described the invention what is claimed is:

1. In an arrangement of the class described, a wheeled vehicle, a driving axle for a pair of said wheels, an electric motor mounted on said vehicle, a sleeve carrying a pinion loosely mounted on said axle, means for coupling said sleeve to said axle, a rack for oscillating said pinion and means for connecting said rack to said motor for reciprocating said rack.

2. In an arrangement of the class described, a vehicle provided with a frame, wheels and a driving axle, an electric motor mounted on said frame, a reduction gearing actuated by said motor, a pinion disengageably connected to said driving axle, a rack for oscillating said pinion, means for operatively connecting said rack to said reduction gearing whereby said rack may be reciprocated, said means being adjustable whereby the movement of the said rack may be varied.

3. In an arrangement of the class described, a vehicle comprising a supporting frame, wheels and a driving axle, an electric motor supported on said frame, a reduction gearing operated by said motor, a housing for enclosing said gearing, a pinion disengagably coupled to said driving axle, a reciprocating rack for oscillating said pinion, a bracket arm bolted to said housing and having a dove-tailed connection with said rack and means for operatively connecting said rack to said reduction gearing.

4. In an arrangement of the class described, a vehicle comprising a supporting frame, wheels and a driving axle, an electric motor supported on said frame, a reduction gearing operated by said motor, a housing for enclosing said gearing, a pinion disenagagably coupled to said driving axle, a reciprocating rack for oscillating said pinion, a bracket arm bolted to said housing and having a dove-tailed connection with said rack and means for operatively connecting said rack to said reduction gearing, said means being adjustable whereby the throw of said rack may be varied.

5. In an arrangement of the class described, a baby carriage comprising a frame, wheels and a driving axle, an electric motor mounted on said frame, a sleeve loosely mounted on said driving axle, said sleeve being formed with a pinion, said sleeve and axle being provided with aligned apertures, a pin adapted to pass through said apertures for coupling said sleeve to said driving axle, a reciprocating rack for oscillating said pinion and means operatively connecting said rack to said motor.

CAMILLE J. KOCH.